May 28, 1929.                    W. GAERTNER                    1,715,030
                                  INDICATOR
                         Filed Aug. 30, 1928        3 Sheets-Sheet 1

Inventor:
William Gaertner
By
Jones, Addington, Ames & Seibold
Att'ys.

May 28, 1929. W. GAERTNER 1,715,030
INDICATOR
Filed Aug. 30, 1928   3 Sheets-Sheet 2

Inventor:
By William Gaertner
Jones, Addington, Ames & Seibold
Att'ys.

Patented May 28, 1929.

1,715,030

UNITED STATES PATENT OFFICE.

WILLIAM GAERTNER, OF CHICAGO, ILLINOIS, ASSIGNOR TO THE GAERTNER SCIENTIFIC CORPORATION, OF CHICAGO, ILLINOIS, A CORPORATION OF ILLINOIS.

INDICATOR.

Application filed August 30, 1928. Serial No. 302,978.

My invention relates to indicators.

Among the objects of my invention are to provide improved indicating means for a spectrometer or any instrument or appliance in which the spacing of the indicia on the scale will be more evenly distributed than in devices now in use; to provide a construction in which the indicia may be more easily read than in devices now in use; and to provide indicating means of such a nature that the indicator parts may be readily housed.

Further objects will appear from the description and claims.

In the drawings, in which an embodiment of the invention is shown,

Figure 1:
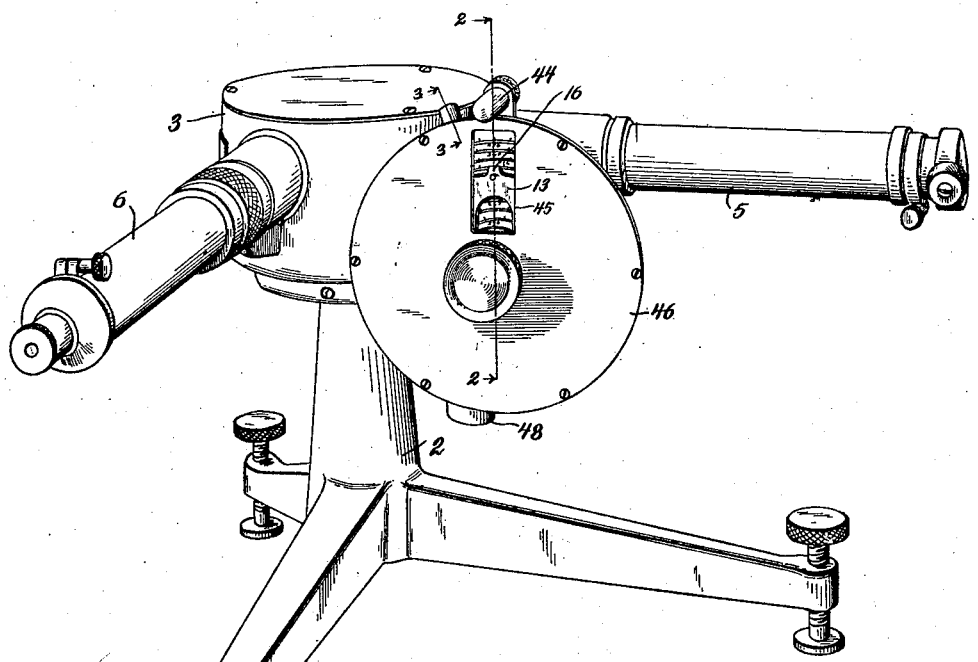
Figure 1 is a perspective view of a spectrometer provided with my improved indicating means.

Referring to the drawings in detail, the construction shown therein comprises a tripod support 2 on which the spectrometer is mounted, a housing member 3 for the prism 4 and associated parts mounted on the tripod, a collimator tube 5 for the incoming rays, a sight tube 6 for the refracted rays, an oscillatably mounted prism support 7 on which the prism is mounted, manually adjustable means for causing oscillation of said support and means for indicating the wave lengths corresponding to the adjusted positions of the prism.

The means for causing oscillation of the prism support comprises a manually rotatable shaft 8, a slidable member 9 having a screw threaded connection with the rotatable member 8, and an arm 10 integral with the oscillatable prism support 7 engaging the slide 9, and a spring 11 for pressing this arm against the slide.

The indicating means comprises a scale carrying cam member 12 secured to rotate with the manually rotatable shaft 8, and a radially movable slide 13 actuated by the spiral cam groove 14 and having a pointer 15 cooperating with the scale indicia.

The spring 11 holds the adjustable bearing point 16 carried by the arm 10 against the upward extension 17 of the slide 9 and this in turn tends to hold the tapering end 18 of the shaft 8 against the bearing member 19. The threaded connection between the slide 9 and the shaft 8 may be adjusted to the right fit by means of a screw 20 for regulating the distance between the split portions 21 of the slide. The slide 9 is cushioned at each of its extremes of movement by means of a pair of leaf springs 22, which springs may be adjusted by means of a pair of screws 23 mounted in the bracket 24 on which the spring is mounted. The slide 9 is held against rotary movement by means of a guide rod 25 mounted on this bracket and engaged by the yoke-shaped arm 26 of the slide. The prism support 7 is rockably mounted on a vertical stud 27 mounted in the housing 3.

Figure 3:
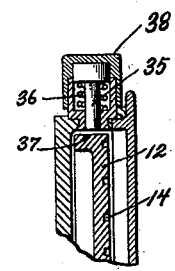
Fig. 3 is a section on the line 3—3 of Fig. 1.
Figure 4:
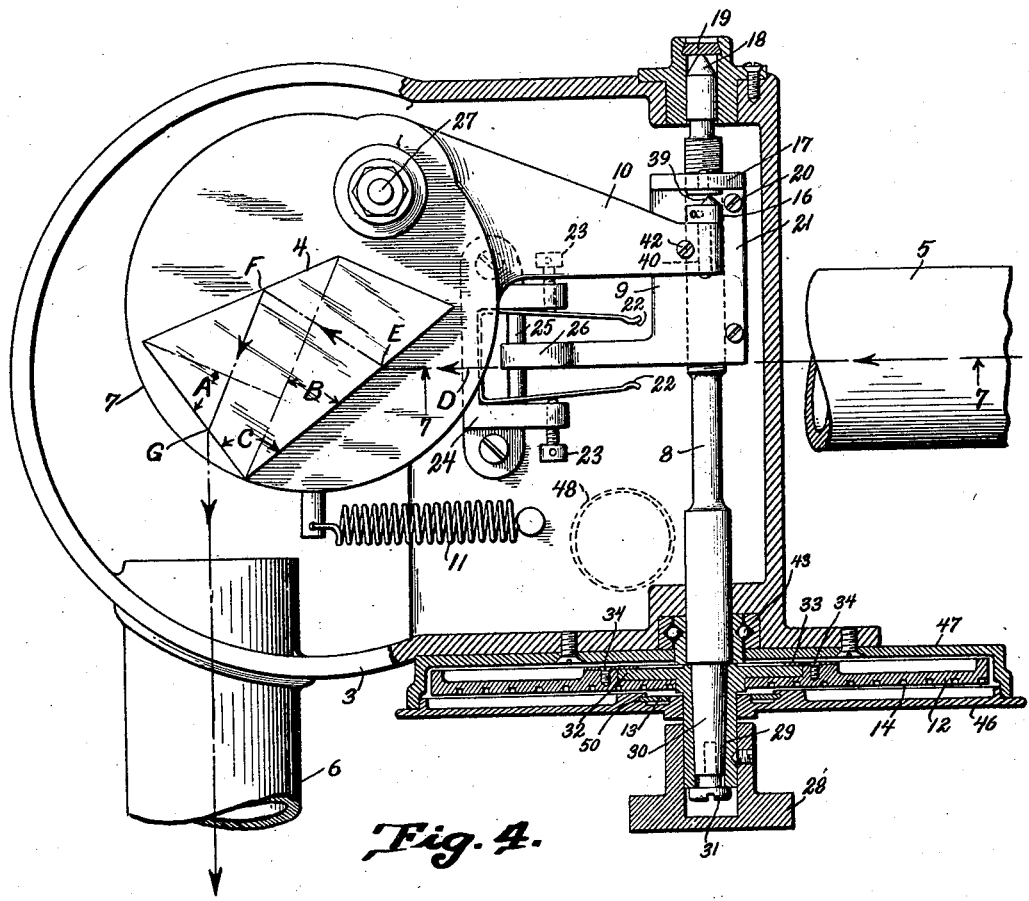
Fig. 4 is a horizontal sectional view showing the indicating device and adjustment.
Figure 5:
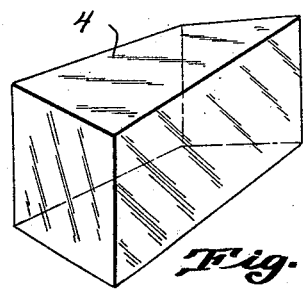
Fig. 5 is a perspective view of one form of prism used.
Figure 6:
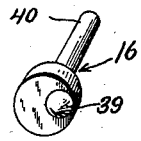
Fig. 6 is a perspective view of an adjustable bearing point.
Figure 7:
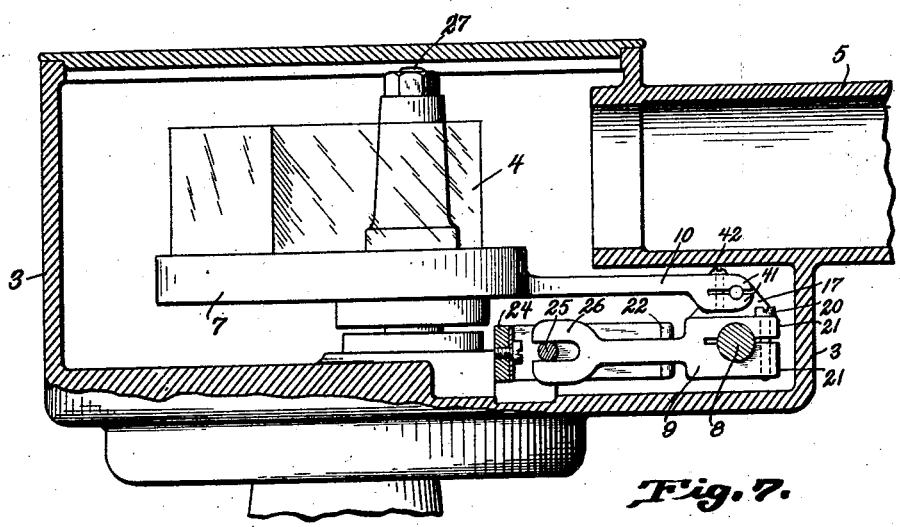
Fig. 7 is a section substantially on the line 7—7 of Fig. 4.

The shaft 8 may be rotated manually by means of a knob 28 secured to a sleeve member 29 which in turn is firmly secured to the tapering portion 30 of the shaft 8 by means of a screw 31 threaded into the end of the shaft. The indicator dial 12 has a slip friction connection with the outwardly extending annular flange 32 on the sleeve member 29, this connection being effected by means of a ring member 33 secured to the dial by means of screws 34. The flange member 32 is seated in an annular recess in the dial and engagement of the flange with the walls of the recess and with the securing ring 33 is such that normally the dial 12 will rotate with the flange 32 but such that when desired the dial or indicator disc 12 may be held against movement while the shaft 8 is being turned. Such an operation is sometimes desirable as will be pointed out more in detail hereinafter. The means for holding the indicator disc against movement when desired comprises a spring pressed pin 35 (Fig. 3) which may when desired be pressed inwardly against the action of the coil compression spring 36 so that the inner end of the pin will press against the outer edge 37 of the indicator disc 12 and hold it against movement, even when the shaft 8 and the flange sleeve 29 are being rotated. This spring pressed pin may normally be covered by a cap 38 which may be removed to permit the use of the holding pin when desired. By means of this slip connection and disc holding arrangement the disc may be positioned in the proper angular relation with respect to the shaft 8.

Thus if it is known that a certain appearance of the lines of the spectrum correspond with a certain wave length the shaft 8 may be turned by means of the knob 28 until the indicator dial 12 has been brought so that its reading corresponds to a certain appearance of the spectrum and the indicating dial may then be held in this position by means of the holding pin 35 while the shaft 8 is turned until the lines of the spectrum corresponding to the dial reading are visible in the sight tube. The operator will then know that the indicator dial is properly positioned on the shaft 8 and will release the holding pin to permit the dial thereafter to turn with the shaft.

In order to adjust the movement of the prism support 7 with respect to the movement of the slide 9 the bearing point member 18 is adjustably mounted in the arm 10 so that the effective length of this arm 10 may be varied. For this purpose the bearing point 39 is made eccentric with respect to the shank 40 of the bearing point member so that the bearing point member may be secured in various adjacent positions by turning the shank 40 in the split portions 41 of the arm 10. A clamping screw 42 is provided for clamping the split portions 41 of the arm against the shank 40 of the bearing member. If desired, a suitable antifriction bearing 43 may be provided for the outer end of the shaft 8. A small electric lamp 44 may be provided for illuminating the sight opening 45 in the front cover plate 46 of the housing 47 for the indicating dial, the battery for this lamp being mounted in a downwardly extending pocket 48.

The use of the spectrometer itself is not different from spectrometers now in use in which the material, whose spectrum is to be investigated, is mounted and treated so as to permit rays emitted therefrom or transmitted thereby to be received by the collimator tube 5 and redirected by the prism 4 so as to enter sight tube 6 when the prism support 7 is adjusted so that the prism 4 is at the proper angle. When the knob 28 has been turned so the lines of the spectrum are properly observed in the sight tube 6 the reading of the indicator dial 12 is made which will enable the observer to determine the nature of the material which is being analyzed. The prism itself may be of any suitable prism material, the angle at C being approximately 90 degrees and the angles at A and B being approximately at 30 degrees. The rays D are refracted at E, reflected at F and again refracted at G.

Figure 2:
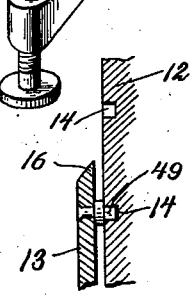
Fig. 2 is a section on the line 2—2 of Fig. 1.

The shifting of the indicator member 13 is effected by means of a follower pin 49 (Fig. 2) secured to the rear face of the indicator member 13 and engaged in the spiral groove 14 in the indicator dial. The indicator member 13 is slidably mounted in grooves 50 in the cover 46 of the dial housing so that as the dial is turned the indicator slide will be shifted up or down, depending on the direction of the rotation of the dial. The dial is provided with indicia 51 arranged adjacent to the spiral groove 14 to cooperate with the pointer 16 to give the wave length reading in Angstroms. In order to cushion the movement at the extreme ends spring bumpers 52 are provided which engage the pin 49 and prevent undue jar.

Figure 8:
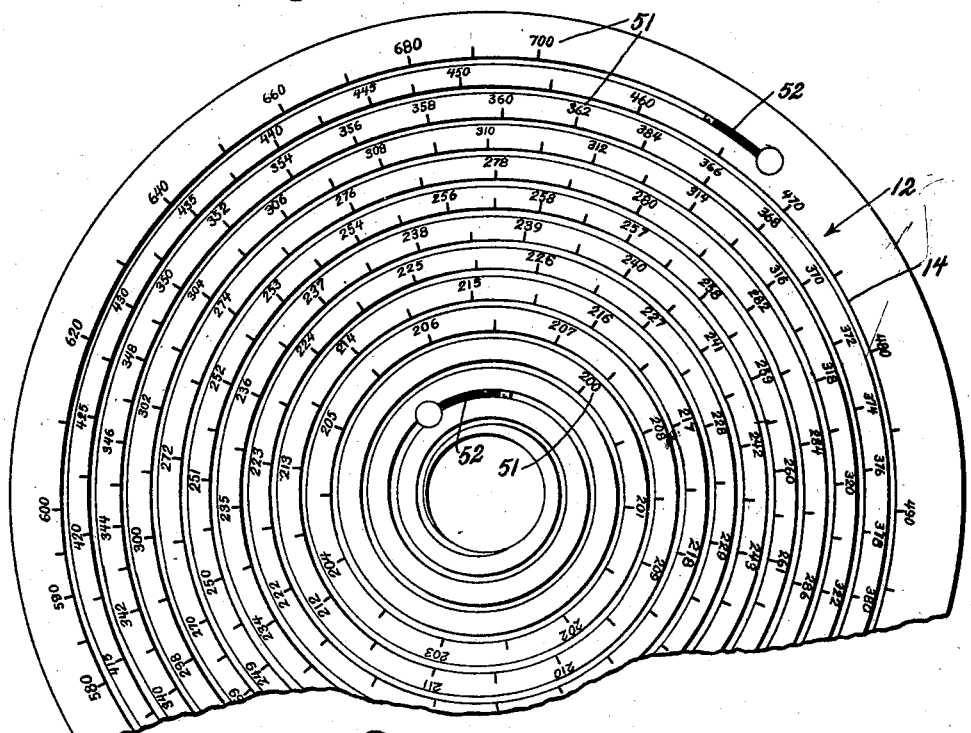
Fig. 8 is an enlarged view showing the indicator dial.

It will be seen that the construction described enables the indicia 51 on the scale to be more evenly distributed in the case of spectrometers and like instruments than in cylinder indicator devices now in use. To illustrate this it will be noted by referring to Fig. 8 that at the inner part of the spiral scale 90 degrees of movement of the dial will give a variation in the reading from 200 Angstroms to 202 Angstroms, whereas, at the outer part of the dial a rotation of 90 degrees will give a variation in the reading of from 600 Angstroms to about 700 Angstroms. This great difference between the variation at the inner part of the dial and the outer part of the dial is somewhat compensated for, however, by the fact that the actual length of 90 degrees of the outer part of the scale is considerably more than the actual length of 90 degrees of the inner part of the scale.

With the customary cylinder indicator having a helical groove in the cylinder the actual length of 90 degrees at one end of the cylinder would be the same as the actual length of 90 degrees at the other end of the cylinder and this would result in extremely unequal distribution of the indicia.

It will also be noted that the indicia on the disc indicator are on flat surfaces, making them much more easily read than the indicia on the usual drum or cylinder type of indicator. It will also be noted that the disc type of indicator is much more easily and simply housed than the usual type of drum or cylinder indicator.

While I have shown but one form of my invention, it is obvious that it may be embodied in other forms covered and defined by the appended claims.

I claim:—

1. An indicator for an adjustable device comprising a manually rotatable member for adjusting the device and means for indicating the reading comprising a rotatable spirally arranged scale of varying radius and a radially movable pointer cooperating with said scale and means whereby as said manually rotatable member is rotated said scale will also be rotated and said pointer move in or out with respect to its axis of rotation, remaining in cooperative relation with said scale, whereby a given axial movement of said manually rotatable member will cause greater relative movement of the pointer with respect to the scale at the outer part of the scale than at the inner part of the scale, said means comprising a spiral cam for moving said pointer and a guide for causing said pointer to move radially, said spiral cam being provided with spring bumpers at the ends thereof for cooperation with said pointer.

2. An indicator for an adjustable device comprising a manually rotatable member for adjusting the device and means for indicating the reading comprising a rotatable spirally arranged scale of varying radius, a housing in which said scale is rotatably mounted and a pointer movable in and out with respect to the axis of rotation of the scale cooperating with said scale, said housing having an elongated radially extending slot therein, and means whereby as said manually rotatable member is rotated said scale will also be rotated and said pointer moved with respect to said axis of rotation in or out along said slot, remaining in cooperative relation with said scale, whereby a given axial movement of said manually rotatable member will cause greater relative movement of the point with respect to the scale at the outer part of the scale than at the inner part of the scale.

3. An indicator for an adjustable device comprising a manually rotatable member for adjusting the device and means for indicating the reading comprising a rotatable spirally arranged scale of varying radius, a circular housing in which said scale is rotatably mounted, having a removable cover in front of said scale and a pointer movable in and out with respect to the axis of rotation of the scale cooperating with said scale, said cover having an elongated radially extending slot therein and means whereby as said manually rotatable member is rotated said scale will also be rotated and said pointer moved with respect to said axis of rotation in or out along said slot, remaining in cooperative relation with said scale, whereby a given axial movement of said manually rotatable member will cause greater relative movement of the pointer with respect to the scale at the outer part of the scale than at the inner part of the scale, said pointer being slidably mounted on said cover.

In witness whereof, I have hereunto subscribed my name.

WM. GAERTNER.